(12) United States Patent
Laville et al.

(10) Patent No.: US 9,840,009 B2
(45) Date of Patent: Dec. 12, 2017

(54) ACTUATION OF A HAND INTENDED FOR BEING PROVIDED ON A HUMANOID ROBOT

(71) Applicant: SOFTBANK ROBOTICS EUROPE, Paris (FR)

(72) Inventors: Jérémy Laville, Paris (FR); Vincent Clerc, Clamart (FR); Bruno Maisonnier, Paris (FR)

(73) Assignee: SOFTBANK ROBOTICS EUROPE, Paris (FR)

( * ) Notice: Subject to any disclaimer, the term of this patent is extended or adjusted under 35 U.S.C. 154(b) by 0 days.

(21) Appl. No.: 15/111,475

(22) PCT Filed: Jan. 22, 2015

(86) PCT No.: PCT/EP2015/051235
§ 371 (c)(1),
(2) Date: Jul. 13, 2016

(87) PCT Pub. No.: WO2015/110521
PCT Pub. Date: Jul. 30, 2015

(65) Prior Publication Data
US 2016/0325437 A1 Nov. 10, 2016

(30) Foreign Application Priority Data

Jan. 22, 2014 (FR) .................................. 14 50531

(51) Int. Cl.
*B66C 1/00* (2006.01)
*B66C 1/42* (2006.01)
*B25J 15/00* (2006.01)
*B25J 15/10* (2006.01)

(52) U.S. Cl.
CPC ........... *B25J 15/0009* (2013.01); *B25J 15/10* (2013.01)

(58) Field of Classification Search
CPC ........ B25J 15/0009; B25J 9/104; B25J 15/04; B25J 15/103; B25J 3/00; B25J 15/10
USPC ........................................................... 294/106
See application file for complete search history.

(56) References Cited

U.S. PATENT DOCUMENTS

| | | | |
|---|---|---|---|
| 6,244,644 B1 * | 6/2001 | Lovchik | B25J 9/104 294/111 |
| 6,494,662 B1 | 12/2002 | De Montalembert | |
| 7,296,835 B2 * | 11/2007 | Blackwell | B25J 9/104 294/106 |
| 8,052,185 B2 * | 11/2011 | Madhani | B25J 15/0009 294/106 |
| 8,565,918 B2 * | 10/2013 | Abdallah | H01R 13/17 700/245 |
| 2004/0054424 A1 | 3/2004 | Matsuda | |

(Continued)

FOREIGN PATENT DOCUMENTS

| | | |
|---|---|---|
| CN | 203236487 U | 10/2013 |
| EP | 1 457 294 A1 | 9/2004 |

(Continued)

*Primary Examiner* — Stephen Vu
(74) *Attorney, Agent, or Firm* — Baker & Hostetler LLP

(57) ABSTRACT

A hand intended for a humanoid robot comprises a palm and several fingers that are motorized relative to the palm. According to the invention, the hand comprises an actuator common to several fingers and a spreader making it possible to distribute a force exerted by the actuator toward the fingers.

13 Claims, 6 Drawing Sheets

(56) References Cited

U.S. PATENT DOCUMENTS

2006/0129248 A1 6/2006 Stark
2010/0249676 A1 9/2010 Kawakami

FOREIGN PATENT DOCUMENTS

| FR | 2 792 865 A1 | 11/2000 |
|----|--------------|---------|
| JP | S50-25708 B | 8/1975 |
| JP | 2003-145474 A | 5/2003 |
| JP | 2010-063723 A | 3/2010 |
| WO | 2010/018358 A2 | 2/2010 |
| WO | 2013/185231 A1 | 12/2013 |

* cited by examiner

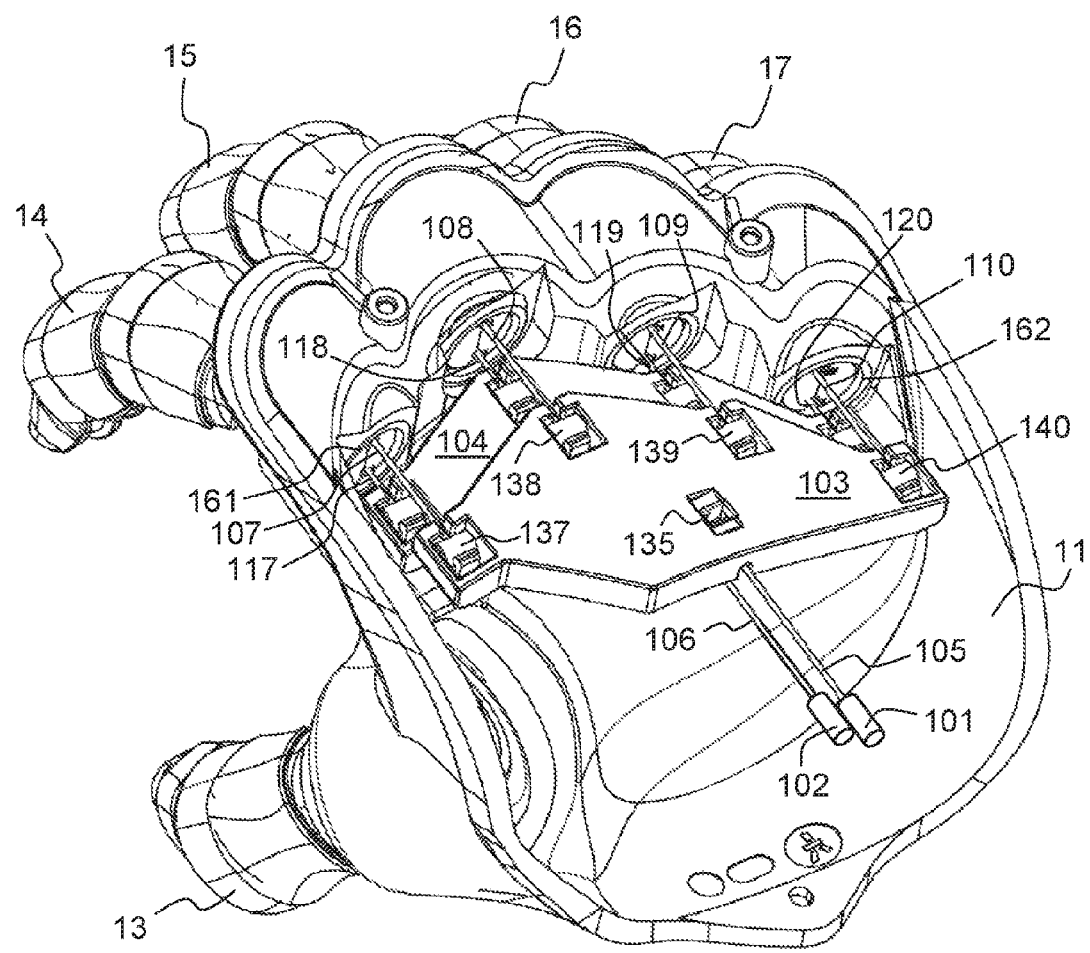
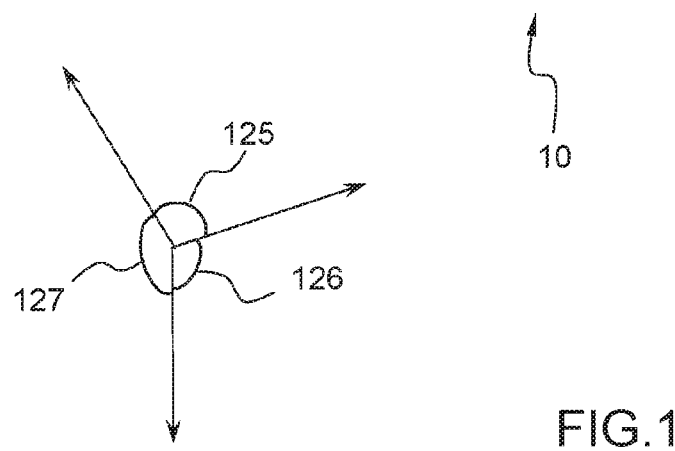
FIG.1

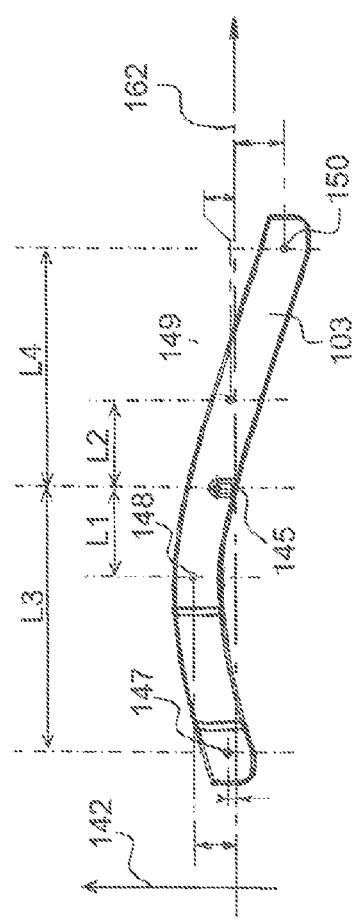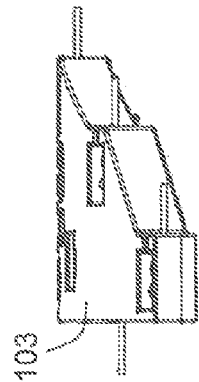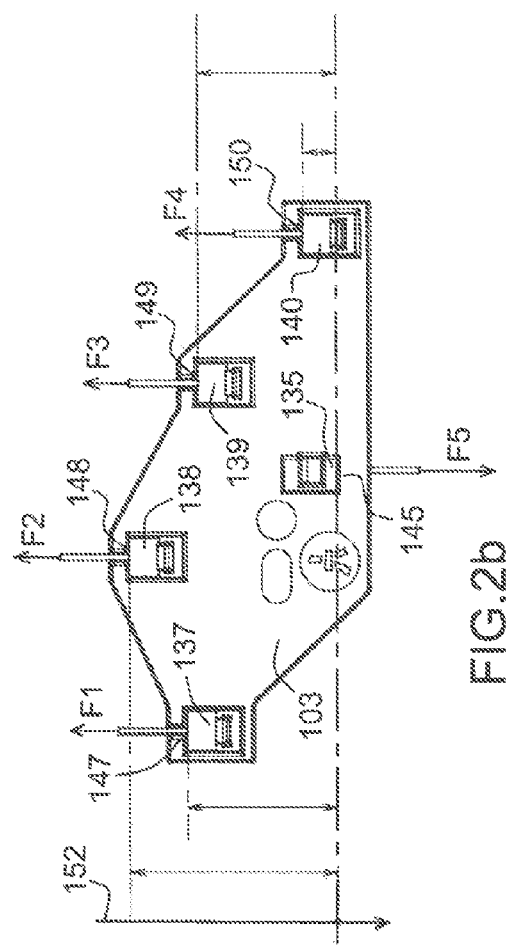

ACTUATION OF A HAND INTENDED FOR BEING PROVIDED ON A HUMANOID ROBOT

CROSS-REFERENCE TO RELATED APPLICATIONS

This application is a National Stage of International patent application PCT/EP2015/051235, filed on Jan. 22, 2015, which claims priority to foreign French patent application No. FR 1450531, filed on Jan. 22, 2014, the disclosures of which are incorporated by reference in their entirety.

FIELD OF THE INVENTION

The invention relates to a hand intended for a humanoid robot.

BACKGROUND

The human hand is an extremely complex part of the human body. It comprises several fingers articulated around the palm of the hand. Moreover, each finger has several mutually articulated phalanges. Each articulation can be moved by means of muscles. The various articulations of the hand notably make it possible to grip objects of various forms. Numerous attempts have been made in humanoid robots to best approximate the human functionalities. The gripping function is one of the functions most difficult to produce by a robotized system, it requires a large number of independent actuators to ensure the gripping of various objects. This increases the complexity of the robot both in terms of the number of independent actuators to be provided and in terms of the driving of these different actuators that have to be controlled in a coordinated manner.

SUMMARY OF THE INVENTION

The invention aims to propose a hand of a humanoid robot that has several fingers and that makes it possible to adapt easily to the form of various objects by reducing the number of independent actuators for each of the fingers of the hand.

To this end, one subject of the invention is a hand intended for a humanoid robot, the hand comprising a palm and several fingers that are motorized relative to the palm, further comprising an actuator common to several fingers and a spreader making it possible to distribute a force exerted by the actuator toward the fingers.

In an advantageous variant of the invention, there are defined, in a plane called frontal plane at right angles to a direction in which the force exerted by the actuator is oriented, the projection of the point of application on the spreader of the force exerted by the actuator and the projections of the points of application on the spreader of the forces exerted by the fingers. There is defined, in the frontal plane, a direction called vertical direction at right angles to the intersection of the frontal plane and of a plane called horizontal plane containing a direction in which the force exerted by the actuator is oriented and in which the palm of the hand mainly extends. According to the vertical direction, the projection of the point of application on the spreader of the force exerted by the actuator is positioned substantially at the barycenter of the projections of the points of application on the spreader of the forces exerted by the fingers, the projections of the points of application on the spreader of the forces exerted by the fingers not all coinciding.

The term spreader is often used in the aeronautical field. By analogy, a spreader can be understood to be any mechanical part that makes it possible to distribute forces. The distribution is done as a function of the geometrical disposition of the bearing points of each of the forces on the mechanical part. The distribution conserves a state of equilibrium of the mechanical part. When the forces applied to the mechanical part evolve slowly, it is possible to determine the different forces from static equilibrium equations. In the invention, the spreader makes it possible to distribute the force from a single actuator to several fingers. The presence of a spreader makes it possible to improve the compliance of the hand to the form of the objects that it is likely to encounter. Compliance of the hand should be understood to mean its capacity to adjust to the stresses and the forces which are exerted on it.

The implementation of a spreader makes it possible for the hand to close by reproducing a fluid and natural movement close to that of a human being. By associating a single actuator with a spreader it becomes possible to perfectly synchronize the movement of the various fingers linked to the spreader.

A humanoid robot comprising a hand according to the invention is also a subject of the invention.

A humanoid robot should be understood to be a robot exhibiting similarities with the human body. It may be the top part of the body, or only an articulated arm ending with a clamp that can be likened to a human hand. In the present invention, the operation of the hand of the robot is similar to that of a human hand. A hand according to the invention makes it possible to grasp objects by virtue of the movements of its fingers and the forces that they can exert on an object.

BRIEF DESCRIPTION OF THE DRAWINGS

The invention will be better understood and other advantages will become apparent on reading the detailed description of an embodiment given as an example, the description being illustrated by the attached drawing in which:

FIG. 1 shows a perspective representation of a hand intended for a humanoid robot;

FIGS. 2a, 2b and 2c represent a spreader of the hand in different plan views;

In the interests of clarity, the same elements will bear the same identifiers in the different figures.

DETAILED DESCRIPTION

Figures 3A, 3B:
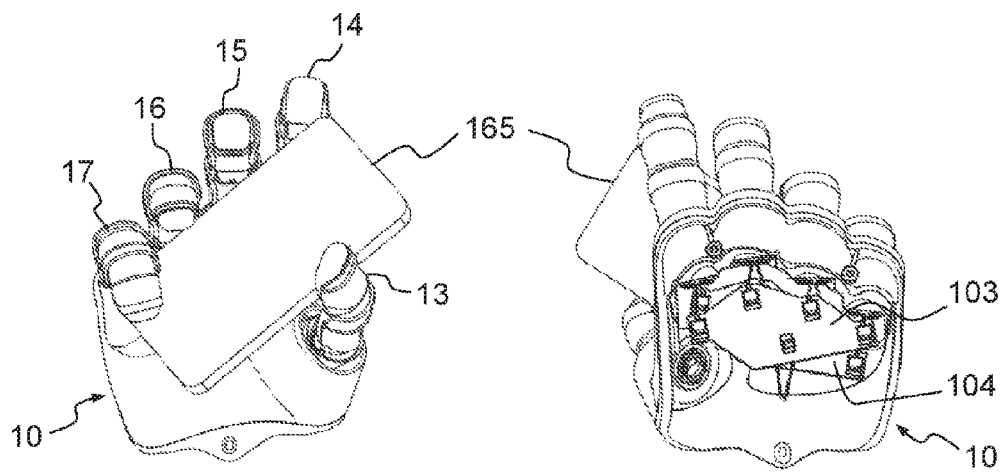
FIGS. 3a, 3b and 3c represent the hand grasping an object.

FIG. 1 represents a hand 10 intended for a humanoid robot. The hand 10 comprises a palm 11 and five fingers 13 to 17. The fingers are articulated to the palm 11 so as to allow objects to be gripped between the fingers 13 to 17. Like a human hand, the finger 13 is a thumb. An object grasped by the hand is held between the thumb 13 and the other fingers 14 to 17. The invention is not limited to a hand that has five fingers. The number of fingers can be reduced to simplify the design of the hand or the number of fingers can even be increased to allow particular objects to be gripped.

More generally, a hand of the invention can be formed by a clamp making it possible to grasp an object. The clamp comprises at least two articulated fingers allowing several points of contact with the object grasped. Opposite these articulated fingers, it is possible to arrange a fixed finger or even, directly, the palm of the hand.

According to the invention, the hand 10 comprises an actuator common to several fingers and a spreader making it possible to distribute a force exerted by the actuator toward the fingers. In the example represented in FIG. 1, the hand 10 comprises two actuators 101 and 102 and two spreaders 103 and 104. The actuator 101 is linked to the spreader 103 by means of a tie rod 105 and the actuator 102 is linked to the spreader 104 by means of a tie rod 106. The spreader 103 can exert a force on the four fingers 14 to 17 respectively via tie rods 107, 108, 109 and 110. Similarly, the spreader 104 can exert a force on the four fingers 14 to 17 respectively via tie rods 117, 118, 119 and 120.

The actuators 101 and 102 can be linear actuators such as cylinders. Any other type of actuator can be implemented in the context of the invention, such as, for example, rotary actuators or artificial muscles.

In the example represented in FIG. 1, the spreaders 103 and 104 make it possible to distribute a force toward four fingers representing the index finger 14, the middle finger 15, the ring finger 16 and the little finger 17. It is also possible to include the thumb 13 in the distribution. More generally, the spreader or spreaders 103 and 104 make it possible to distribute a force exerted by the actuator or actuators 101 and 102 toward the thumb 13 and at least one other finger 14 to 17.

The two spreaders 103 and 104 each extend mainly in a plane called horizontal plane containing a direction in which the force exerted by the associated actuator is oriented and in which the palm of the hand 10 mainly extends.

A finger can be actuated by two tie rods, for example the tie rods 107 and 117 for the index finger 14, one to extend the finger 14 and the other to fold it back. The two tie rods 107 and 117 then act in a coordinated manner. The actuators 101 and 102 also act in a coordinated manner. It is possible to use a single actuator which pulls on one of the tie rods 105 or 106 and pushes on the other simultaneously. The hand 10 comprises two spreaders 103 and 104 making it possible to motorize each of the fingers 14, 15, 16 and 17. The spreader 103 makes it possible to extend the fingers which are connected to it and therefore open the hand 10. The spreader 104 makes it possible to fold back the fingers which are connected to it and therefore close the hand 10.

A reference frame linked to the palm 11 of the hand 10 is defined. The palm extends mainly in a plane 125 called horizontal plane. When the fingers 14 to 17 are completely unfolded or open, thy extend in the plane 125. In the configuration represented in FIG. 1, the spreaders 103 and 104 extend mainly in the horizontal plane 125. The tie rods 105 and 106 also extend in the horizontal plane 125. Consequently, the directions in which the forces are exerted by the actuators 101 and 102 are contained in the plane 125.

A frontal plane 126 is defined that is at right angles to the horizontal plane 125 and to the directions in which the forces exerted by the actuators 101 and 102 are oriented.

Finally, a third plane 127, called vertical plane, is defined which is at right angles to the planes 125 and 126. When the fingers 14 to 17 close or extend, the phalanges are displaced essentially in a vertical plane.

FIG. 2a represents one of the spreaders, for example the spreader 103 by projection in a frontal plane.

FIG. 2b represents the same spreader 103 by projection in a horizontal plane and FIG. 2c represents the spreader 103 in a vertical plane.

The spreader 103 extends mainly in a horizontal plane. It can nevertheless have a certain curvature relative to this plane. This curvature is clearly visible in FIG. 2a. This figure shows the projections, in the frontal plane, of the points of application of the different forces on the spreader 103. More specifically, the tie rods 105, 107, 108, 109 and 110 can be cables whose ends have outgrowths, respectively 135, 137, 138, 139 and 140 crimped or molded onto an end of the cable. The outgrowths of each of the cables are held in channels produced in the spreader 103. The points of application of the forces are the points of contact of the outgrowths with the spreader 103. The force exerted by the actuator 101 on the spreader 103 is identified F5. The forces exerted by the fingers 14, 15, 16 and 17 are respectively identified F1, F2, F3 and F4. The point of application of the force exerted by the actuator 101 via the tie rod 105 bears the identifier 145. The point of application of the force exerted by the tie rod 107 bears the identifier 147. The point of application of the force exerted by the tie rod 108 bears the identifier 148. The point of application of the force exerted by the tie rod 109 bears the identifier 149 and the point of application of the force exerted by the tie rod 110 bears the identifier 150.

In the frontal plane 126, a vertical direction 142 is defined that is at right angles to the intersection of the frontal plane 126 and of the horizontal plane 125. The projection of the point of application 145 of the force exerted by the actuator 101 is advantageously positioned substantially at the barycenter of the projections of the points of application 137 to 140 of the forces exerted by the fingers 14 to 17.

More specifically, in the vertical direction 142, the abscissa of the projection of the point of application 145 is defined as origin. The sum of the abscissae of the projections of the points of application 147 to 150 is zero. The projections on the vertical direction 142 of the points of application 147 to 150 on the spreader 103 of the forces F1 to F4 exerted by the fingers 14 to 17 do not all coincide.

This relative position of the different points of application of the forces F1 to F5 on the spreader 103 makes it possible to retain a stable position of the spreader 103 in the palm 11 of the hand 10. In effect, the forces F1 to F4 exerted by the fingers on the spreader 103 can evolve according to the form of an object grasped by the hand 10. The relative position of the different points of application of the forces F1 to F5 on the spreader 103 that is thus defined makes is possible the keep the spreader 103 in a substantially constant relative position in relation to the horizontal plane 125. The spreader 103 can be displaced in translation in a direction substantially contained by the horizontal plane 125.

Moreover, a frontal direction 152, visible in FIG. 2b, is defined. The direction 152 is parallel to the direction in which the force F5 exerted by the actuator 101 is oriented. According to the frontal direction 152, the projection of the point of application 145 on the spreader 103 of the force F5 exerted by the actuator 101 is considered as origin, and the direction in which the actuator 101 pulls on the spreader 103 is considered as positive direction. The abscissae of the projections of the points of application 147 to 150 on the spreader 103 of the forces F1 to F4 exerted by the fingers 14 to 17 are all negative.

This relative position of the different points of application of the forces F1 to F5 on the spreader 103 makes it possible to avoid any butting of the spreader 103 in the palm 11 of the hand 10.

Finally, a third direction 162 at right angles to the directions 142 and 152 can be defined. According to the direction 162, the projection of the point of application 145 of the force exerted by the actuator 101 is advantageously positioned substantially in the middle of the projections of the points of application 148 and 149. Similarly, still according to the direction 162, the projection of the point of application 145 is advantageously positioned substantially in the middle of the projections of the points of application 147 and 150. In other words, according to the direction 162, several distances separating the projection of the point of application 145 from the other projections are defined: L1 for the projection of the point 148, L2 for the projection of the point 149, L3 for the projection of the point 147 and L4 for the projection of the point 150. Advantageously, L1=L2 and L3=L4.

The observance of the position of the point of application 145 in the middle of the fingers two by two makes it possible to distribute the forces of the actuator 101 toward the different fingers 14 to 17 in a balanced manner. In other words, for a given pulling force applied by the actuator 101, the force exerted on each of the four fingers 14 to 17 is equal to a quarter of the force exerted by the actuator 101.

It is possible to generalize this arrangement regardless of the number of fingers connected to the spreader 103. More specifically, according to the direction 162, the projection of the point of application 145 of the force exerted by the actuator 101 is situated at the barycenter of the projection of the points of application of the forces exerted by the fingers 14 to 17 linked to the spreader 103.

A balanced distribution of the forces of the different fingers linked to the spreader makes it possible to adopt a gripping of the objects grasped that is close to a human grip regardless of the form of the objects, even with a single actuator 101.

Figure 3C:
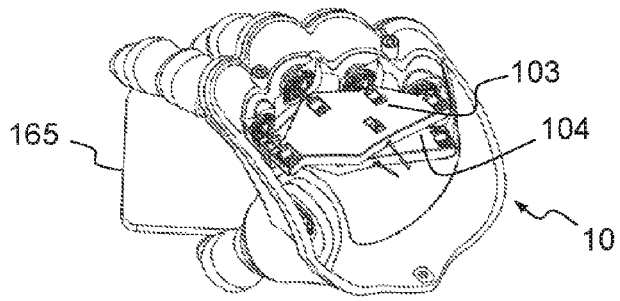

FIGS. 3a, 3b and 3c represent the hand 10 grasping a rectangular object 165, such as a cell phone for example. The five fingers 13 to 17 are in contact with the object 165. The form of the object 165 requires each of the fingers 14 to 17 linked to the spreaders 103 and 104 to fold differently. More specifically, the index finger 14 is slightly folded and, by contrast, the little finger 17 is greatly folded. In FIG. 1, with no object grasped, the fingers 14 to 17 linked to the spreaders 103 and 104 are folded substantially in the same manner. The presence of the object 165 modifies the folding of the fingers 14 to 17 while retaining a substantially constant force exerted by each of the fingers 14 to 17 on the object 165.

A rotation is applied between the spreaders 103 and 104 to adapt to the object 165. This rotation can be seen between FIG. 1 with no object grasped and FIGS. 3a to 3c with the object 165. The presence of one or two spreaders makes it possible for the hand to adapt to the form of the object grasped.

Figure 4:
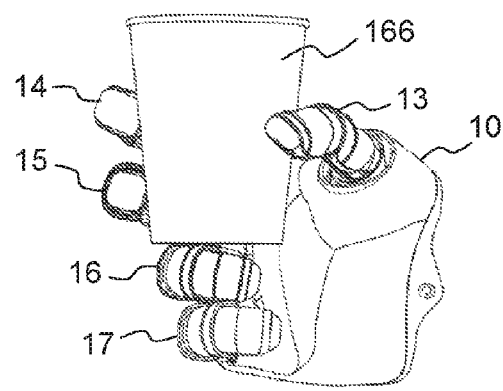
FIG. 4 represents the hand grasping another object.

FIG. 4 represents the hand 10 grasping a circular object 166, such as a beaker for example. The object 166 is only held by three fingers out of five. The object 166 is held on one side by the thumb 13 and on the other side by the index finger 14 and the middle finger 15. By virtue of the spreaders 103 and 104, the other two fingers 16 and 17 are folded completely to come into abutment for example against the palm of the hand 10. The equality of the forces exerted by the fingers 14 to 17 is not perfect in the case of an object like the beaker 166. Nevertheless, the forces of the different fingers 14 to 17 are more balanced than in the absence of a spreader.

Generally, the implementation of a spreader makes it possible to distribute the force exerted by the actuator associated with this spreader over the different fingers. Thus, the different fingers can exert a substantially constant force on an object grasped by the hand even if the form of the object is variable.

Alternatively, it is possible to move away from the equilibrium obtained by positioning the point of application 145 of the actuator 101 at the barycenter of the points of application 147 to 150 of the tie rods linked to the fingers 14 to 17. It is for example possible to displace the point of application 145 toward the index finger 14 and thus distribute more forces to the index finger 14. The index finger 14 will tend to close ahead of the other fingers. The index finger 14 then exerts a greater force than the other fingers on the object grasped.

At the limit, it is possible to align the point of application 147 of the index finger of the hand 10 with the point of application 145 of the actuator 101. This makes it possible to ensure that an object is gripped only between the thumb 13 and the index finger 14.

Figure 5:
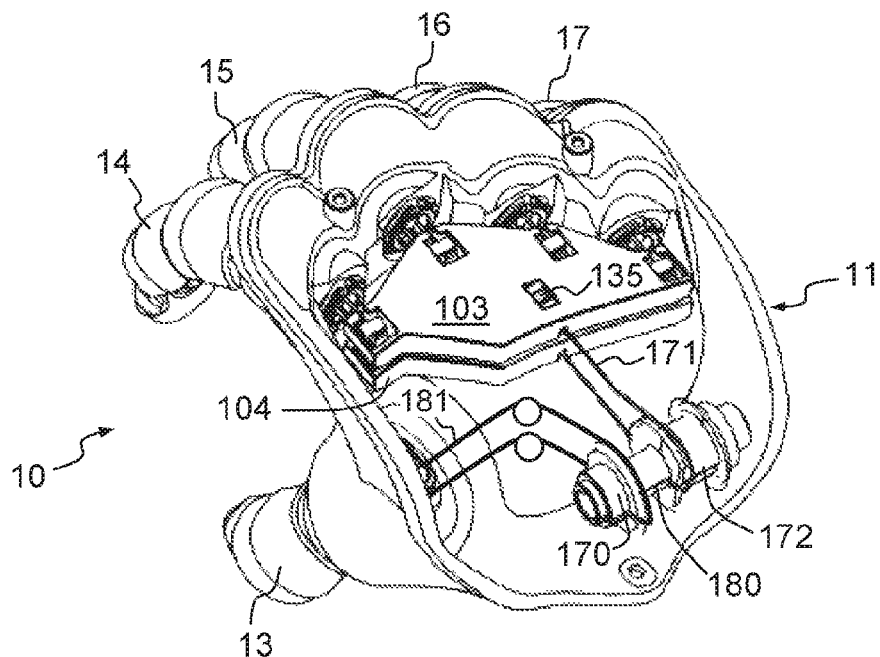
FIGS. 5, 6 and 7 are perspective representations of several variants of the hand.

FIG. 5 represents a variant of the hand 10 in which a dual-acting actuator 170 acts on the two spreaders 103 and 104. The two tie rods 105 and 106 represented in the variant of FIG. 1 are replaced by a cable 171 having two ends each fixed to one of the spreaders 103 and 104. More specifically one end of the cable is formed by the outgrowth 135. The other end of the cable 171, not visible in FIG. 5, is similar and is fixed to the spreader 104. The actuator 170 is common to the two spreaders 103 and 104. The actuator 170 is for example a rotary actuator which drives a pulley 172 in rotation. The cable 171 winds on the pulley 172. The rotation of the pulley 172 displaces the cable 171 which pulls on one of the spreaders 103 and 104 and pushes on the other.

When the two spreaders 103 and 104 are substantially parallel, the cable 171 is in contact with the pulley 172 over approximately half the diameter of the pulley 172. The winding of the cable 171 on the pulley 172 makes it possible to transmit a torque that is a function of the length of cable 171 in contact with the pulley 172. The torque transmitted is also a function of the friction coefficient of the cable 171 relative to the pulley 172 and therefore of the nature of the materials in contact chosen for the cable 171 and for the pulley 172. It is possible to define these materials to produce a torque limiter and therefore a limiter of force on the fingers 14 to 17. For example, if a significant external force is applied to the fingers 14 to 17, it is possible to allow the cable 171 to slip relative to the pulley 172, notably to protect the actuator 170.

Alternatively, there may be a desire to avoid any slip of the cable 171 relative to the pulley 172, notably if the actuator 170 is provided with a position sensor making it possible to determine the position of the fingers 14 to 17. To avoid any slip, it is for example possible to wind the cable 171 over more than one turn around the pulley 171. It is also possible to fix the cable 171 to the pulley.

Figure 6:
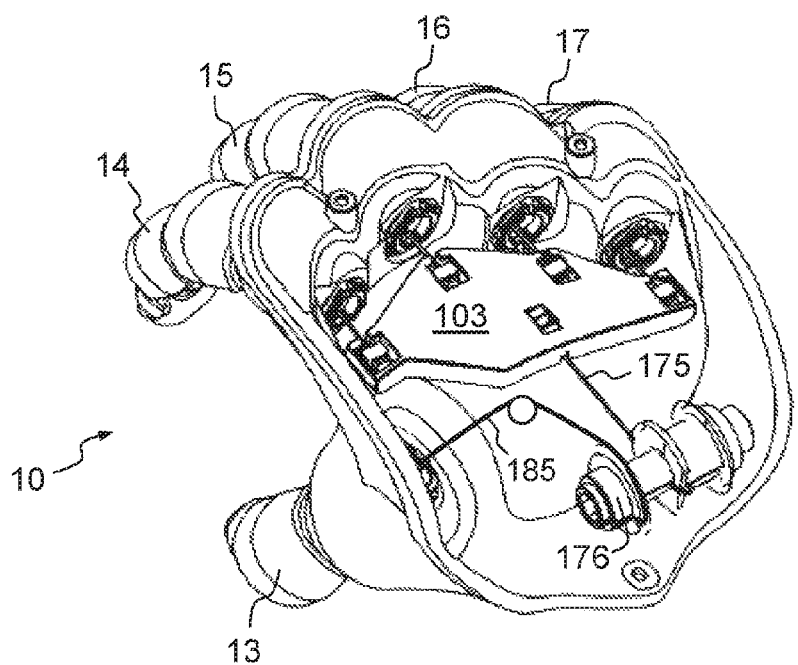

FIG. 6 represents another variant of the hand 10 that has only a single spreader 103 actuated by a cable 175 and a dual-acting actuator 176. Each finger 14 to 17 comprises an elastic element, such as, for example, a spring tending to keep the fingers 14 to 17 in an extreme position, either folded back or extended. Via the spreader 103, the actuator 176 allows each of the fingers to move away from its extreme position. For example, the fingers 14 to 17 held in extended position by a spring are folded back by means of the actuator 176.

Figure 7:
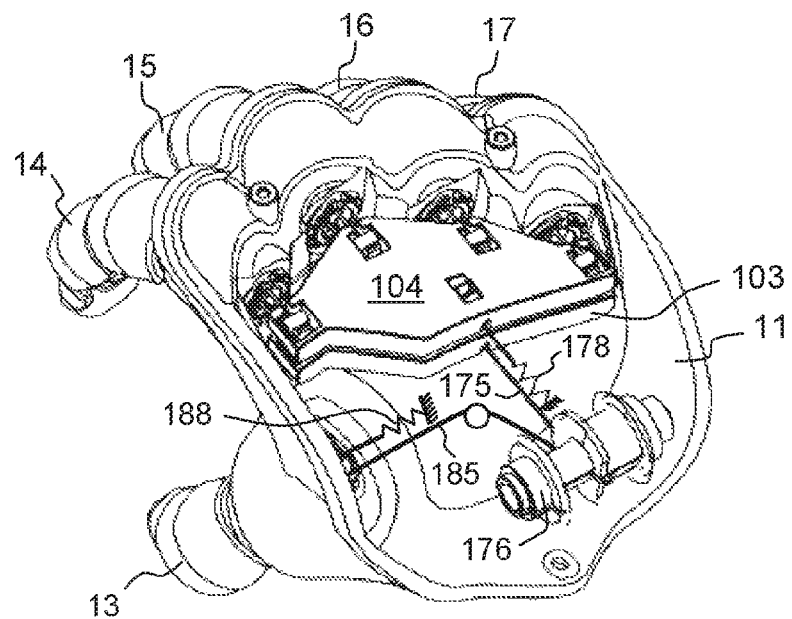

FIG. 7 presents a variant of FIG. 6 in which the return spring is common to all the fingers 14 to 17. This variant once again has the two spreaders 103 and 104. As in the variant of FIG. 6, the spreader 103 is linked to the actuator 176 via the cable 175. Furthermore, the spreader 104 is linked to the body of the palm 11 via a spring 178. Thus, when the actuator 176 pulls on the spreader 103, a return force common to the fingers 14 to 17 is applied by virtue of the spreader 104. The return force is distributed over the fingers 14 to 17 by the spreader 104.

Another configuration consists in using the two spreaders 103 and 104 each to act on different phalanges of the fingers 14 to 17. The two actuators 101 and 102 are then independent.

In the variants represented in FIGS. 5, 6 and 7, the actuator 170 or 176 exerts a force on the thumb 13 independently of the spreader or spreaders 103 and 104.

To this end, in the variant of FIG. 5, the actuator 170 rotationally drives a second pulley 180 on which is wound a cable 181 making it possible to transmit a force to the thumb 13. Like the cable 171, the cable 181 makes it possible to fold and extend the thumb 13. It is possible to provide two free pulleys 182 on which the cable 181 presses to modify its direction between the actuator 170 and the thumb 13. The cables 171 and 181 each associated with a pulley 172 and 180 are configured to fold the thumb 13 and the other fingers 14 to 17 upon the same rotation of the actuator 170. A reverse rotation of the actuator 170 makes it possible to extend the thumb 13 and the other fingers 14 to 17. Thus, a single actuator makes it possible to close the hand 10 or to open it on the object grasped.

This configuration where the thumb 13 and the other four fingers 14 to 17 are controlled by the same actuator can be transposed to the other variants of FIGS. 6 and 7. Thus, in the variant of FIG. 6, the thumb 13 is actuated by a cable 185 linked to the actuator 176 independently of the spreader 103. In the variant of FIG. 7, a return force is exerted on the thumb 13 via a spring 188. This return force opposes the force exerted by the cable 185.

Advantageously, the hand 10 comprises stops limiting the displacement of the spreader or spreaders 103 and 104. Stops 161 and 162 are for example formed in the palm 10 at the level of the fingers 14 and 17. The spreaders 103 and 104 bear against one stop or against the two stops 161 and 162 when the corresponding tie rods are at the end of travel. More specifically, the spreader 104 comes to bear against the stop 161 when the index finger 14 is extended to the desired maximum. The bearing of the spreader 104 on the stop 161 avoids a turning back of the index finger 14 beyond its extended position. This turning back would be similar to a luxation of one of the articulations of the phalanges in human anatomy. In other words, the bearing on the stop makes it possible to limit the angular travel of the articulations of the finger concerned. The bearing of the spreader 104 against the stop 162 makes it possible, in the same way, to limit the extension of the little finger 17. The two stops 161 and 162 positioned at the level of the extreme fingers 14 and 17 are sufficient to limit the extension of all the fingers associated with the spreader 104. Similarly, the spreader 103 can also come to bear on the stops 161 and 162 in order to limit the folding of the fingers 14 to 17.

Figure 8:
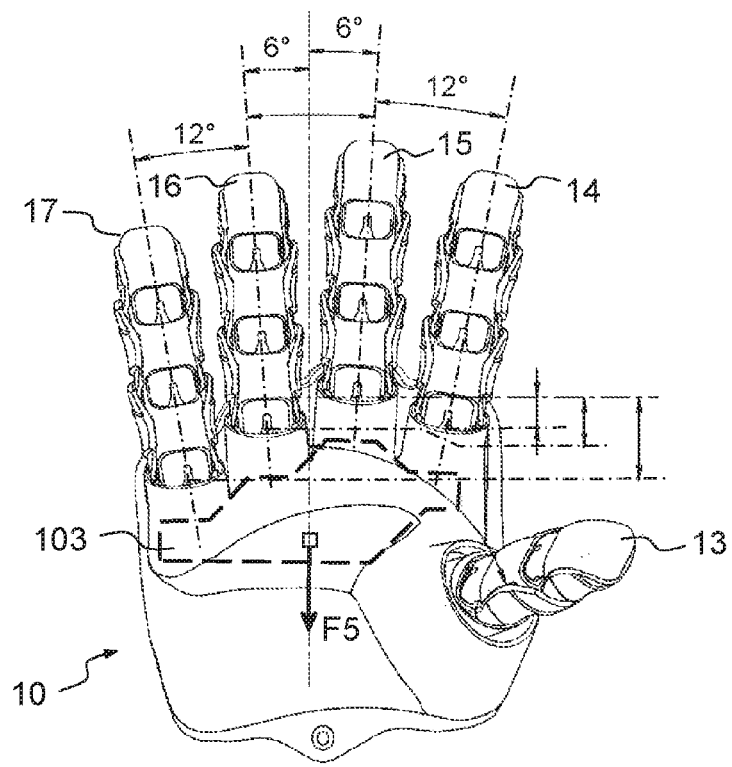
FIG. 8 represents the open hand seen from the palm side.
Figure 9:
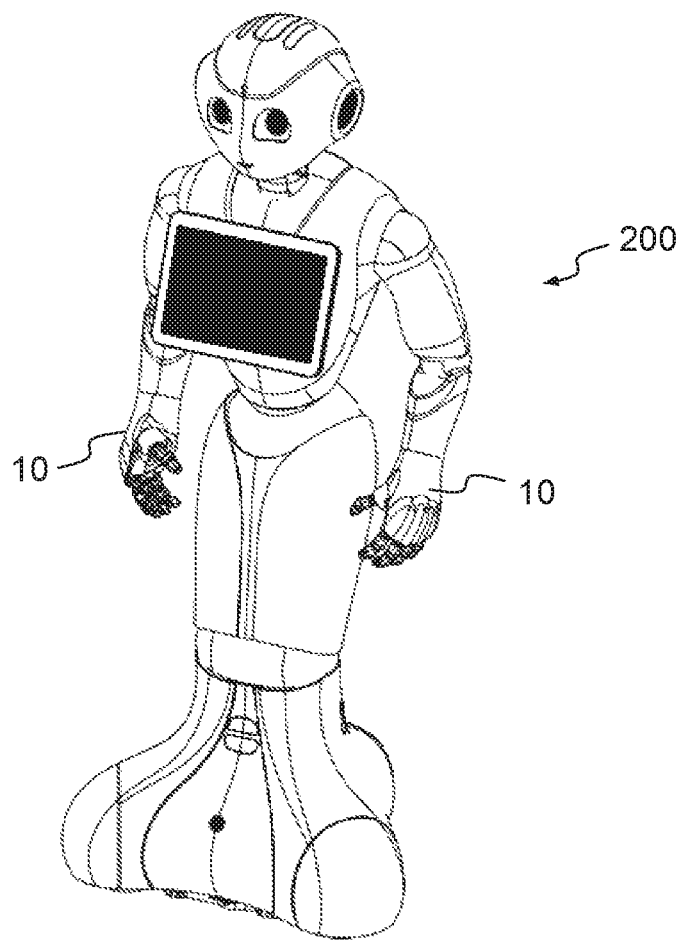
FIG. 9 represents a humanoid robot implementing the hand of the invention.

FIG. 8 represents the open hand seen from the palm side. This view makes it possible to specify the position of the points of application of the fingers linked to the spreader and the mutual orientation of the fingers. More specifically, using FIG. 2b, it has been specified that, relative to the frontal direction 152, the abscissae of the projections of the points of application 147 to 150 on the spreader 103 are all negative. The origin of the abscissae is the projection of the point of application 145 of the force applied by the actuator. It is possible to better approximate the human anatomy by differentiating the different abscissae of the projections of the points of application 147 to 150 on the frontal direction 152. More specifically, as an absolute value, the abscissa of the point of application 150 of the force F4 exerted by the little finger 17 is the smallest. As an absolute value, the abscissa of the point of application 148 of the force F2 exerted by the middle finger 15 is the greatest. As an absolute value, the abscissae of the points of application 147 and 149 of the forces F1 and F3 exerted by the index finger 14 and the ring finger 16 have intermediate values lying between the abscissa of the points of application 148 and 150.

Advantageously, the four fingers 14 to 17 linked to the spreader are identical. This makes it possible to simplify the manufacture thereof by standardizing the mechanical parts of which they are composed. Although the fingers of the hand 10 are identical, which is not the case in a human hand, by staggering the points of application 147 to 150 and therefore the attachment of the fingers to the palm 11 it is possible for the hand 10 to approximate the human anatomy with regard to the disposition of the ends of the fingers 14 to 17.

Moreover, it is possible to orient the four fingers 14 to 17 differently in the frontal plane so that, when the fingers close, the ends of each of the fingers tend to move toward one another. More specifically, relative to the direction in which the force F5 is applied, the directions in which the fingers linked to the spreader concerned extend open angularly more and more as the point of application of the finger concerned moves away from the direction in which the force F5 is applied. The direction in which a finger extends should be understood to be a main direction of the finger when the latter is extended. In the example represented, the middle finger and the ring finger extend in directions each forming an angle of approximately 6° with the direction in which the force F5 is applied. The ring finger 16 and the little finger 17 extend in directions forming an angle of approximately 12° between them. Similarly, the index finger 14 and the middle finger 15 extend in directions forming an angle of approximately 12° between them. On closing, the ends of the fingers move toward one another, which facilitates the grip between the four fingers 14 to 17 and the thumb 13. Obviously, these angular values are given purely by way of example. Other values are of course possible.

FIG. 8 represents a humanoid robot 200 having two hands 10.

The invention claimed is:

1. A hand intended for a humanoid robot, the hand comprising:
    a palm and several fingers that are motorized relative to the palm,
    an actuator common to the several fingers, and
    a spreader to distribute a force exerted by the actuator toward the fingers,
    wherein there are defined, in a frontal plane at right angles to a direction in which the force exerted by the actuator is oriented, a projection in said frontal plane of a point of application on the spreader of the force exerted by the actuator and projections in said frontal plane of points of application on the spreader of forces, exerted by the fingers, and
    wherein there is defined, in the frontal plane, a vertical direction at right angles to an intersection of the frontal plane and of a horizontal plane containing a direction in which the force exerted by the actuator is oriented and in which the palm of the hand mainly extends, and wherein, according to the vertical direction, the projection in said frontal plane of the point of application on the spreader of the force exerted by the actuator is positioned substantially at a barycenter of the projections in said frontal plane of the points of application on the spreader of the forces exerted by the fingers, the projections in said frontal plane of the points of application on the spreader of the forces exerted by the fingers not all coinciding.

2. The hand as claimed in claim 1, wherein there are defined, in the horizontal plane containing the direction in which the force exerted by the actuator is oriented and in which the palm of the hand mainly extends, a projection in said horizontal plane of the point of application on the spreader of the force exerted by the actuator and projections in said horizontal plane of points of application on the spreader of the forces exerted by the fingers, and wherein there is defined a frontal direction parallel to the direction in which the force exerted by the actuator is oriented, and wherein, by considering the projection in said horizontal plane of the point of application on the spreader of the force exerted by the actuator as an origin of a coordinate axis along said frontal direction, and by considering the direction in which the actuator pulls on the spreader to be a positive direction along said coordinate axis along said frontal direction, abscissae of the projections of the points of application on the spreader of the forces exerted by the fingers are all negative values on said coordinate axis along said frontal direction.

3. The hand as claimed in claim 2, wherein the several fingers comprise four fingers linked to the spreader, of which a first finger forms an index finger, a second forms a middle finger, a third forms a ring finger and a fourth forms a little finger, and wherein, in the projection in said horizontal plane and relative to the coordinate axis along said frontal direction and as an absolute value, an abscissa of the point of application of the force exerted by the little finger is smallest of the four fingers, an abscissa of the point of application of the force exerted by the middle finger is greatest of the four fingers, and abscissae of the points of application of the forces exerted by the index finger and the ring finger have values between the abscissa of the of the point of application of the force exerted by the little finger and the abscissa of the of the point of application of the force exerted by the middle finger.

4. The hand as claimed in claim 3, wherein the four fingers linked to the spreader are identical.

5. The hand as claimed in claim 1, wherein there are defined, in the horizontal plane containing a direction in which the force exerted by the actuator is oriented and in which the palm of the hand mainly extends, a projection in said horizontal plane of the point of application on the spreader of the force exerted by the actuator and projections in said horizontal plane of the points of application on the spreader of the forces exerted by the fingers, and wherein, according to a direction of the horizontal plane at right angles to the direction in which the force exerted by the actuator is oriented, the projection in said horizontal plane of the point of application of the force exerted by the actuator is situated at a barycenter of the projection in said horizontal plane of the points of application of the forces exerted by the fingers linked to the spreader.

6. The hand as claimed in claim 1, wherein the spreader extends mainly in the horizontal plane containing a direction in which the force exerted by the actuator is oriented and in which the palm of the hand mainly extends.

7. The hand as claimed in claim 1, wherein the actuator is a dual-acting actuator and comprising a single spreader linked to the dual-acting actuator.

8. The hand as claimed in claim 1, further comprising two spreaders making it possible to motorize each of the fingers by dual action.

9. The hand as claimed in claim 8, further comprising a dual-acting actuator common to the two spreaders.

10. The hand as claimed in claim 9, wherein the actuator common to the two spreaders acts on the two spreaders via a cable winding on a pulley driven in rotation by the actuator common to the two spreaders.

11. The hand as claimed in claim 1, further comprising stops limiting the displacement of the spreader.

12. The hand as claimed in claim 1, further comprising a thumb and wherein the actuator exerts a force on the thumb independently of the spreader.

13. A humanoid robot, further comprising a hand as claimed in claim 1.

* * * * *